United States Patent
Neiser et al.

(10) Patent No.: US 7,370,752 B2
(45) Date of Patent: May 13, 2008

(54) CONTROLLED CONVEYOR

(75) Inventors: Raymond R. Neiser, Mason, OH (US); Randall J. Harrison, London, OH (US)

(73) Assignee: Intelligrated, Inc., Mason, OH (US)

( * ) Notice: Subject to any disclaimer, the term of this patent is extended or adjusted under 35 U.S.C. 154(b) by 0 days.

(21) Appl. No.: 10/804,922

(22) Filed: Mar. 19, 2004

(65) Prior Publication Data

US 2004/0222070 A1 Nov. 11, 2004

Related U.S. Application Data (60) Provisional application No. 60/455,755, filed on Mar. 19, 2003.

(51) Int. Cl.
*B65G 13/02* (2006.01)

(52) U.S. Cl. ............... 198/786; 198/790; 198/561

(58) Field of Classification Search .......... 198/560, 198/561, 562, 563, 565, 566, 443, 444, 447, 198/448, 781.1, 786, 790
See application file for complete search history.

(56) References Cited

U.S. PATENT DOCUMENTS

| | | | |
|---|---|---|---|
| 790,779 A | 5/1905 | Alvey | |
| 883,297 A | 3/1908 | Courtney | |
| 958,004 A | 5/1910 | Phelan | |
| 1,890,753 A | 12/1932 | Scheurer | |
| 2,100,423 A | 11/1937 | Ziegler | |
| 2,145,475 A | 1/1939 | Cook | |
| 2,834,447 A | 5/1958 | Gmur | |
| 3,101,829 A | 8/1963 | Silver | |
| 3,503,490 A * | 3/1970 | Heyne | 198/779 |
| 3,532,201 A | 10/1970 | McConnell | |
| 4,039,074 A * | 8/1977 | Maxted | 198/786 |
| 5,005,693 A * | 4/1991 | Fultz et al. | 198/781.06 |
| 5,033,600 A | 7/1991 | Klein | |
| 5,060,785 A * | 10/1991 | Garrity | 198/781.06 |
| 5,070,987 A | 12/1991 | Koltookian | |
| 5,086,910 A | 2/1992 | Terpstra | |
| 5,213,189 A | 5/1993 | Agnoff | |
| 5,375,689 A | 12/1994 | Sapp | |
| 5,456,347 A | 10/1995 | Best | |
| 5,490,587 A | 2/1996 | Fisher | |

(Continued)

FOREIGN PATENT DOCUMENTS

| | | |
|---|---|---|
| DE | 3725113 A1 | 9/1988 |
| FR | 2 530 590 | 5/1982 |

OTHER PUBLICATIONS

Ermanco Application Bulletin Minimum Pressure Accumulator - Dated Apr. 1990.

(Continued)

*Primary Examiner*—James R. Bidwell
(74) *Attorney, Agent, or Firm*—Frost Brown Todd LLC (57) ABSTRACT

A declined conveyor for conveying articles in a downstream direction, which is parallel to a longitudinal direction, has one or more controlled conveyor sections interposed between gravity conveyors. Each controlled conveyor includes a plurality of driven rollers which are driven by a drive member disposed generally parallel to the longitudinal direction, and is operatively connected to a plurality of the driven rollers through O belts.

33 Claims, 7 Drawing Sheets

U.S. PATENT DOCUMENTS

| | | | |
|---|---|---|---|
| 5,531,311 A * | 7/1996 | LeMay et al. | 198/448 |
| 5,562,195 A | 10/1996 | Isaacs | |
| 5,642,799 A | 7/1997 | Wassilow | |
| 5,901,827 A | 5/1999 | Belz | |
| 6,685,005 B2 * | 2/2004 | Youn | 198/790 |

OTHER PUBLICATIONS

Ermanco "Xenobrake Application" Dated 1988.

Description of horizontal accumulation conveyor believed to have been in use in the USA prior to Mar. 19, 2003.

* cited by examiner

CONTROLLED CONVEYOR

This application claims priority from U.S. Provisional Patent Application Ser. No. 60/455,755, filed Mar. 19, 2003, titled Controlled Zone Conveyor, the disclosure of which is incorporated herein by reference.

TECHNICAL FIELD

This invention relates to a declined conveyor, and more particularly to a declined conveyor having controlled conveyors interposed between gravity conveyors for improved control. The invention will be disclosed in connection with a controlled conveyor having a conveying surface defined by rollers which are driven by an underlying longitudinally disposed drive roller.

BACKGROUND OF THE INVENTION

Declined conveyors are well known. They are used in many different applications, such as to convey packages to loading bays for loading onto trucks. Declined conveyors may be powered conveyors, such as declined belt conveyors. Declined conveyors may be non-powered, such as gravity conveyors comprising skate wheels or rollers which are free to rotate. Gravity conveyors can function to accumulate packages, eliminating the need for a separate accumulation conveyor. While gravity conveyors are less expensive than powered declined conveyors, their free flowing nature presents flow control problems that can result in impacts between packages thereby interrupting flow, causing jams, misorienting packages, causing package damage or other interruptions to product flow.

The pitch of a gravity conveyor must be great enough for light weight packages to spin the rollers, as is necessary to continue traveling down the conveyor, yet small enough to minimize heavy cartons from gaining too much momentum and crashing into other packages. A gravity conveyor may lack sufficient control to avoid overfeeding the conveyor which carries packages from the lower end of the gravity conveyor.

In order for an initial package to continue traveling down a gravity conveyor, it must overcome the inertia of each roller or wheel it contacts and start it spinning, which removes energy from the package, slowing it down. If a trailing package is following closely enough, the rollers or wheels may still be spinning, so the trailing package does not have to start the rollers or wheels, and thus its speed does not decrease as much as the first package (and may actually increase). Depending on spacing, subsequent packages may be accelerated by the spinning rollers or wheels, and impact the leading packages.

It is known to provide spaced apart, constant speed driven rollers as part of the conveying surface, generally perpendicular to the direction of package travel, acting as a brake. However, while relatively inexpensive, such a configuration often does not provide enough control.

It is also known to provide brakes to stop a group of rollers from spinning. Such brakes typically act on the lower surface of the rollers. However, light packages which are stopped thereby may have difficulty restarting.

The present invention represents an economical solution to controlling package flow down declined conveyors.

BRIEF DESCRIPTION OF THE DRAWING

The accompanying drawings incorporated in and forming a part of the specification illustrate several aspects of the present invention, and together with the description serve to explain the principles of the invention. In the drawings.

Reference will now be made in detail to an embodiment of the invention, an example of which is illustrated in the accompanying drawings.

DETAILED DESCRIPTION OF AN EMBODIMENT OF THE INVENTION

Figure 1:
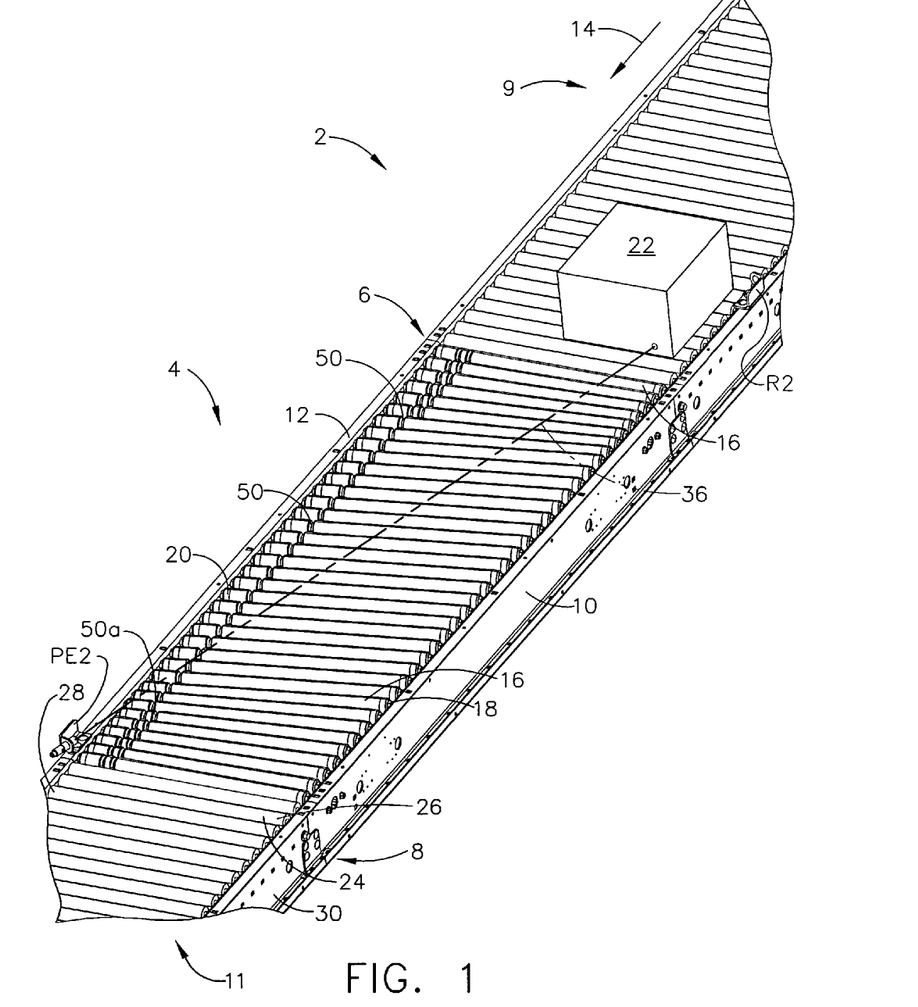
FIG. 1 is a fragmentary perspective view of a declined conveyor illustrating a controlled conveyor section constructed in accordance with the teachings of the present invention, with the drive elements and edge guard omitted for clarity.

Referring now to the drawings in detail, which depict an exemplary embodiment of the present invention, wherein like numerals indicate the same elements throughout the views, FIG. 1 is a fragmentary perspective view of declined conveyor generally indicated at 2. Conveyor 2 includes controlled conveyor section 4 having first end 6 and second end 8. First end 6 is the entrance of controlled conveyor section 4, which receives articles from adjacent gravity conveyor 9 disposed immediately upstream of controlled conveyor section 4. Second end 8 is the exit, or discharge, end of controlled conveyor section 4, which discharges articles to adjacent gravity conveyor 11 disposed immediately downstream of controlled conveyor section 4. Controlled conveyor section 4 has a pair of spaced apart conveyor side frames 10, 12, disposed generally parallel to each other and extending in a longitudinal direction which is aligned with the downstream direction, indicated by arrow 14. Controlled conveyor section 4 includes a plurality of conveyor rollers 16. Each conveyor roller 16 is constructed similarly, being rotatable about an axis of rotation which is disposed transverse (not necessarily perpendicular) to the downstream direction. Each conveyor roller 16 includes spaced apart ends 18, 20 which are supported by side frames 10, 12, respectively. Each conveyor roller 16 is generally cylindrical, the upper edge of which defines the conveying surface along which articles such as package 22 are transported.

Figure 2:
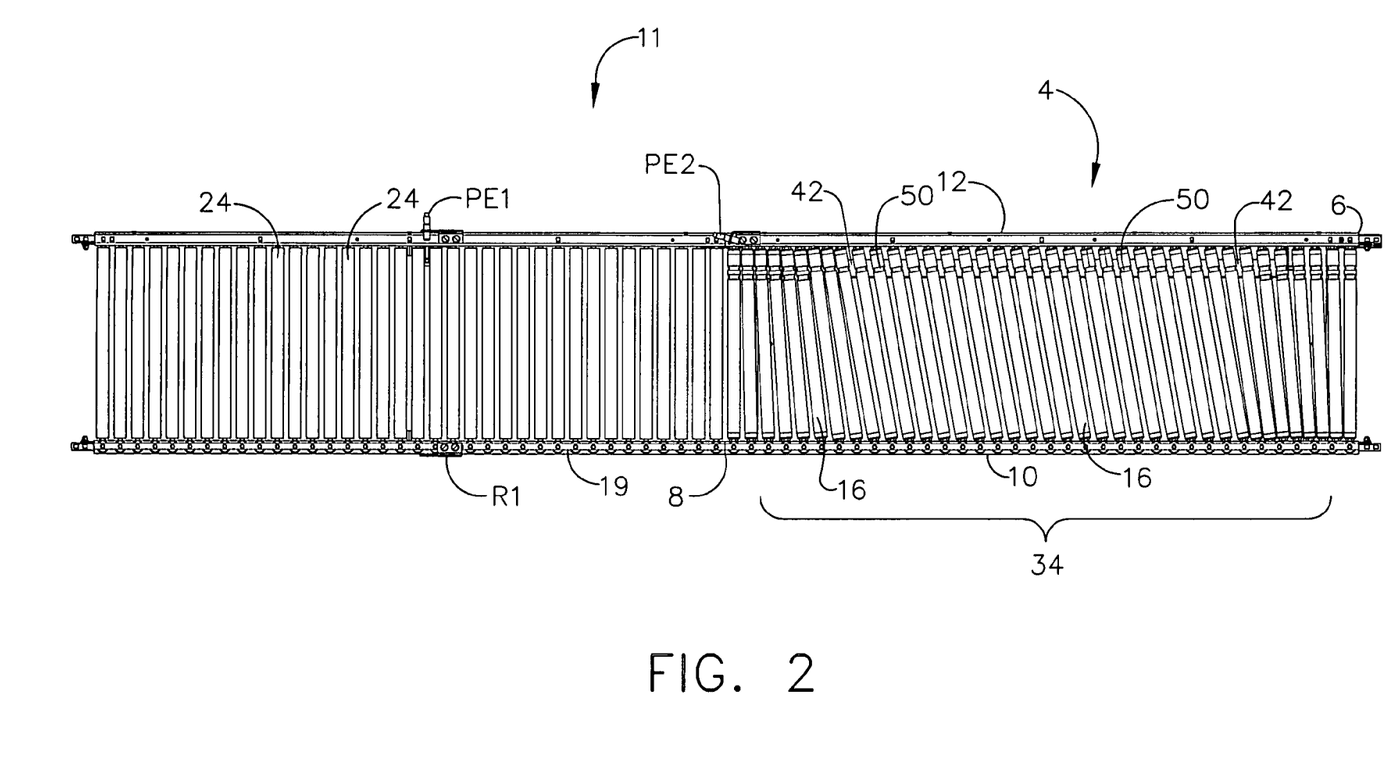
FIG. 2 is a top plan view of the controlled zone conveyor and downstream gravity conveyor of FIG. 1, omitting the upstream gravity conveyor.

Referring also to FIG. 2, controlled conveyor 4 is disposed upstream of and adjacent to gravity conveyor 11. Gravity conveyor 11 may be of any construction known for gravity conveyors. As depicted, gravity conveyor includes a plurality of conveyor rollers 24. Each conveyor roller 24 is constructed similarly, being generally cylindrical and rotatable about an axis of rotation which is disposed transverse to the downstream direction. Each conveyor roller 24 includes spaced apart ends 26, 28 which are supported by side frames 30, 32, respectively of gravity conveyor 11. Alternatively, gravity conveyor 11, or any of the gravity conveyors discussed herein, could be skate wheel conveyors.

As depicted, the length of controlled conveyor 4 is the same as that of gravity conveyor 11, although not required to be. In the depicted embodiment, controlled conveyor 4 and gravity conveyor 11 are six feet long. If space allows, a longer controlled conveyor 4 may provide additional effectiveness to the control of packages being conveyed. Controlled conveyor 4 and gravity conveyor 11 may be constructed as individual sections, as shown, being bolted together. Alternatively, the side frames on each side may be a single piece, such forming a single, unitary conveyor comprising controlled conveyor 4 and gravity conveyor 11.

Controlled conveyor 4 includes two sensors, PE1 and PE2. Sensor PE1 is located a distance downstream of exit 8 of controlled conveyor 4, in gravity conveyor 11. In the embodiment depicted, sensor PE1 is a photo eye, and as is known, reflector R1 is located across from sensor PE1. Sensor PE1 generates a beam and detects any interruption of the beam reflected back by reflector R1. Alternatively, reflector R1 could be a receiver for a beam generated by sensor PE1. Still yet, proximity sensors or even mechanical sensors may be used. Any type of package presence sensor can be used for any of the sensors, and as used herein, sensor refers to any device in any orientation which is used to detect the presence of an article at a location or in an area on the conveyor, and is not limited to the photo eyes depicted. Sensor PE1 detects the presence of any object which blocks the photo eye beam, and is configured to send a signal to a controller (not shown) to notify the controller of the presence of a package at sensor PE1.

Sensor PE2 is disposed adjacent second end 8 of controlled conveyor 4. In the embodiment depicted, it is disposed on the side of side frame 12, opposite the side of side frame 10 along which packages are aligned by skewed roller section 34, as will be discussed below. Sensor PE2 is angled upstream across controlled conveyor 4, targeting reflector R2 disposed in the embodiment depicted about three to four feet upstream of the end of controlled zone 4, in upstream gravity conveyor 9. Sensor PE2 is configured to detect packages arriving at entrance 6 while still in upstream conveyor 9, such as shown by package 22. In the orientation shown, sensor PE2 also detects the packages as they travel through at least a portion of controlled conveyor 4. The location at which a package in controlled conveyor 4 will cease to be detected by sensor PE2 depends on the location and orientation of sensor PE2, and the package size and position on the conveyor. For example, with package aligned on the side of conveyor side frame 10, the lateral width and longitudinal length of the package will determine when the trailing edges of the package clear beam 36 emanating from sensor PE2. Sensor PE2 is configured to send a signal to controller (not shown) to notify the controller of the presence of a package. Sensor PE2 may be oriented in any orientation which provides the desired monitoring, at least of arriving packages. Monitoring package presence throughout at least a portion of controlled conveyor 4 may be accomplished by more than one appropriately placed sensor, or even omitted with a similar control result being accomplished with timers.

Figure 3:
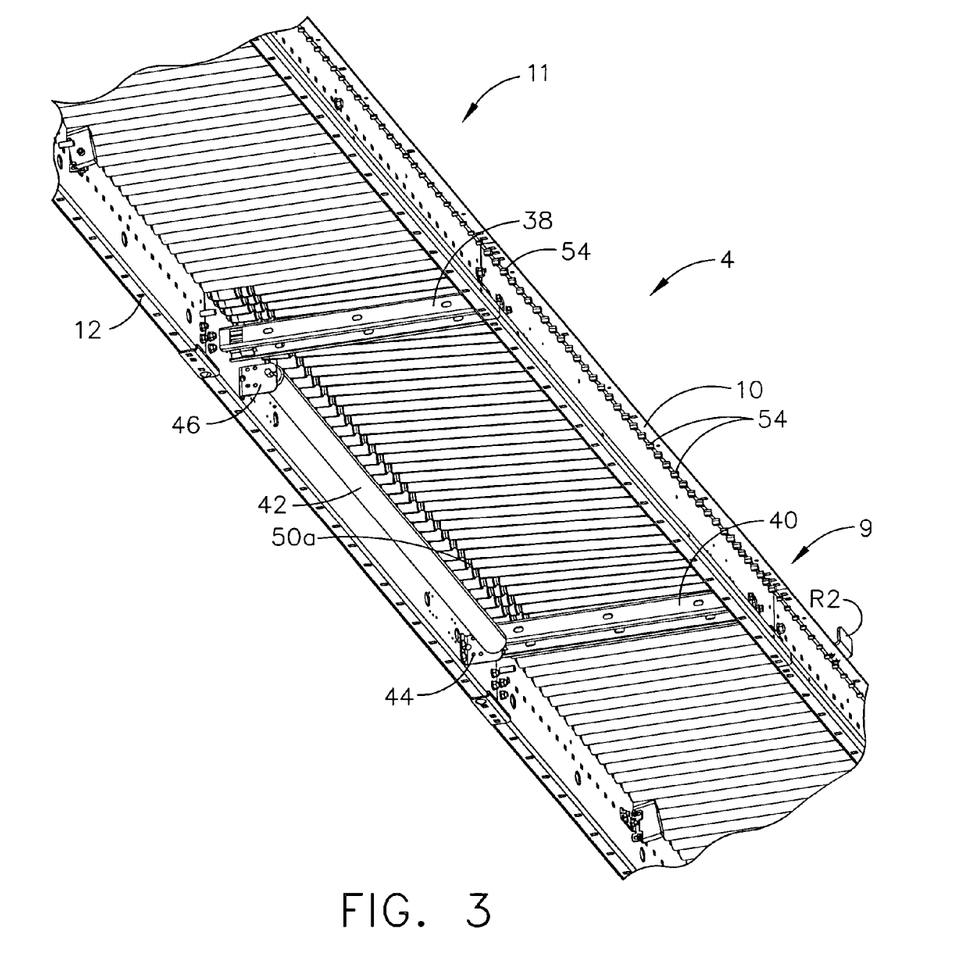
FIG. 3 is a bottom plan view of the controlled zone conveyor of FIG. 1.
Figure 4:
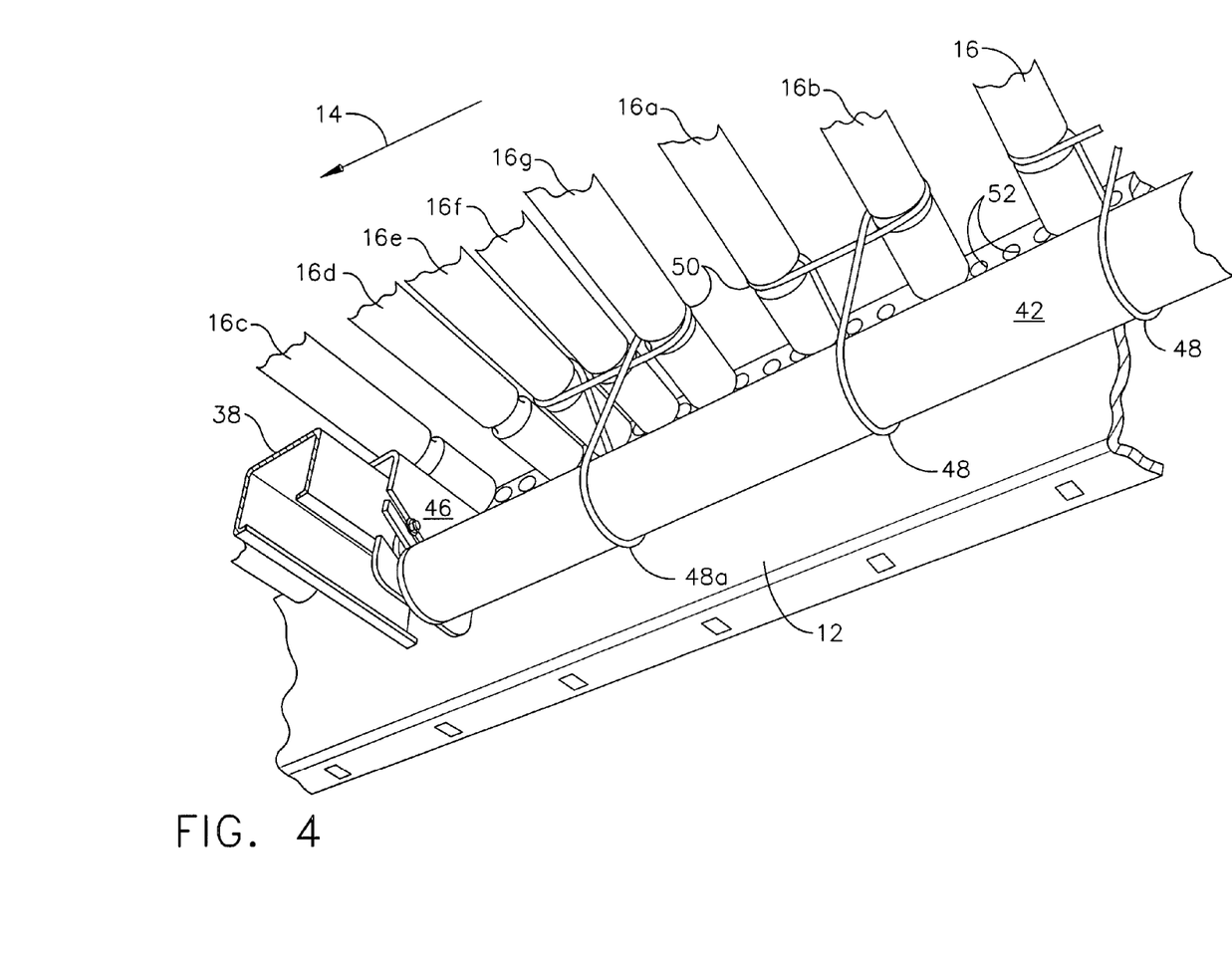
FIG. 4 is an enlarged, fragmentary, bottom perspective view of one end of the controlled zone conveyor of FIG. 1, showing the drive member, conveyor rollers and drive elements.

Referring also to FIG. 3, which is a bottom plan view of the controlled zone conveyor of FIG. 1, cross members 38, 40 span between side frames 10, 12, holding them in the appropriate position. Controlled conveyor 4 includes drive member 42 which is carried by controlled conveyor 4 through brackets 44, 46, disposed below the conveying surface. Brackets 44, 46 may be mounted to side frame 12 as illustrated in FIG. 3, or to cross members 38, 40, as illustrated in FIG. 4. Drive member 42 is rotatable about a drive axis of rotation, and is oriented with its drive axis of rotation extending generally in the downstream longitudinal direction.

In the depicted embodiment, drive member 42 is a self powered roller, also referred to as a motor driven roller, or MDR. Drive member 42 is depicted as a tube having a generally cylindrical shape, with the drive motor and gear reduction, if any, disposed within the tube. Alternatively, the drive motor may be external to the tube, such as carried by bracket 44 or 46, or a separate bracket.

In the depicted embodiment, drive member 42 is a 55.72 inch (1415 mm) long, 24 vDC, low torque MDR available from ITOH Denki, part number PM-486FE-15-1400-D024, PM-486FC-20-1400-D024 or PM-486FC-30-1400-D024 (depending on speed, for example as discussed below in reference to FIG. 6), having a 1.9 inch (48.6 mm) outside diameter. The length of drive member 42 was selected based on the longest commercially available MDR, although other individually powered drive member may be used, as well as two or more MDRs. It is noted that the cost of a single 55.72 inch long MDR is less than the cost of two 30 inch long MDRs.

Referring to FIG. 4, which is an enlarged, fragmentary, bottom perspective view of one end of drive member 42, near end 8 of controlled conveyor 4, of FIG. 1, showing drive member 42, conveyor rollers 16 and drive elements 48. Drive member 42 is connected to conveyor rollers 16 in a driving relationship through drive elements 48.

In the embodiment depicted, drive elements are elastomeric O-belts, as are well known. As shown, each conveyor roller 16 includes an annular groove 50 which is configured to receive O-belt 48. In the embodiment depicted, a single O-belt 48 drives more than one conveyor roller 16, wrapping partially around the top of downstream conveyor roller 16*a* in groove 50, under roller 16*a* to the annular groove 50 at the bottom side of conveyor roller 16*b*, around conveyor roller 16*b*, and returning from the top in between conveyor rollers 16*a* and 16*b*, to wrap around drive member 42. Drive member 42, may have, but does not require, grooves for O-belts 48. Alternatively, a single O-belt may drive a single conveyor roller 16, although such a configuration, in the aggregate, can place a higher torque load on drive member 42. As a result of the smaller diameter of annular groove 50, the speed of conveyor rollers 16 is slightly greater than if annular groove 50 was omitted, and conveyor rollers 16 were driven on their maximum outer diameter. It is noted that losses and slippage may occur between O-belts 48, drive member 42 and conveyor rollers 16. Ultimately, the speed of conveyor rollers 16 relative to the speed of drive member 42 depends on the diameters of the two, and any losses and slippage of O-belts 48. For example, a measured tangential speed of about 51 feet per minute for drive member 42 produced a measured tangential speed of about 61 feet per minute in a conveyor roller.

As seen in FIGS. 1–4, controlled conveyor 4 includes skewed roller section 34, which may comprise the entirety of conveyor rollers 16, or exclude one or more conveyor rollers 16 at ends 6 and 8. When conveyor rollers 16 are being driven, skewed roller section 34 drives the packages toward skate wheel guard 19 disposed along the top of side frame 10 (see FIG. 2), as is well known, tending to align the packages along the edge.

In order to accommodate various center distances, a plurality of openings 52 are provided in side frames 10, 12, which receive the axle ends 54 of conveyor rollers 16. For conveyor rollers 16 on a 2 inch center, openings 52 may be formed on 1 inch or 2 inch centers; for conveyor rollers on a 3 inch center, openings 52 may be formed on 1 inch or 1½ inch centers. Openings 52 may be formed on a variety of centers, accommodating a variety of roller centers and skew angles. It is noted that axle ends 54 may have any known shape, such as round or hexagonal.

The center distances of openings 52 are used to create the skew in skewed roller section 34, by offsetting the ends of the conveyor rollers 16. For example, the skew offset could be 4½ inches (1½41 spacing of openings 52) on a 22" distance between the frame sides. As another example, the skew offset could be 4 inches (1 inch spacing of openings 52).

Skewed roller section 34 is not required for practice of the present invention, but the advantages of edge aligning from the skew are lost.

In FIG. 4, rollers 16d–16g are skewed various amounts, fanning out as the downstream end of skewed roller section 34 returns to non-skewed rollers, at least conveying roller 16c as depicted, although there may be more than one non-skewed rollers. End 6 is configured similarly. O-belt 48a is shown engaging two conveyor rollers 16e and 16g. The spacing at this end of the conveyor rollers leaves less room for the O-belt than, for example, between skewed conveyor rollers 16a and 16b. Additional annular grooves 50a can be seen in FIGS. 1 and 2, which are used to slave conveyor rollers, which are not driven directly by drive member 42, to other conveyor rollers. Slaving rollers to other rollers in this manner is known.

Optionally, after aligning the packages along guard rail 19, it may be desirable to minimize drag of the guard rail on the packages by proving a small gap therebetween as the packages progress downstream of skewed roller section 34. This can be done in a variety of ways, such as disposing the guard rail 19 in controlled conveyor 4 slightly offset inwardly of the guard rails in the gravity conveyors. Another way could be to provide a short reverse angle skew section at end 8 of controlled conveyor 4 to move the packages slightly away from guard rail 19.

Figure 5:
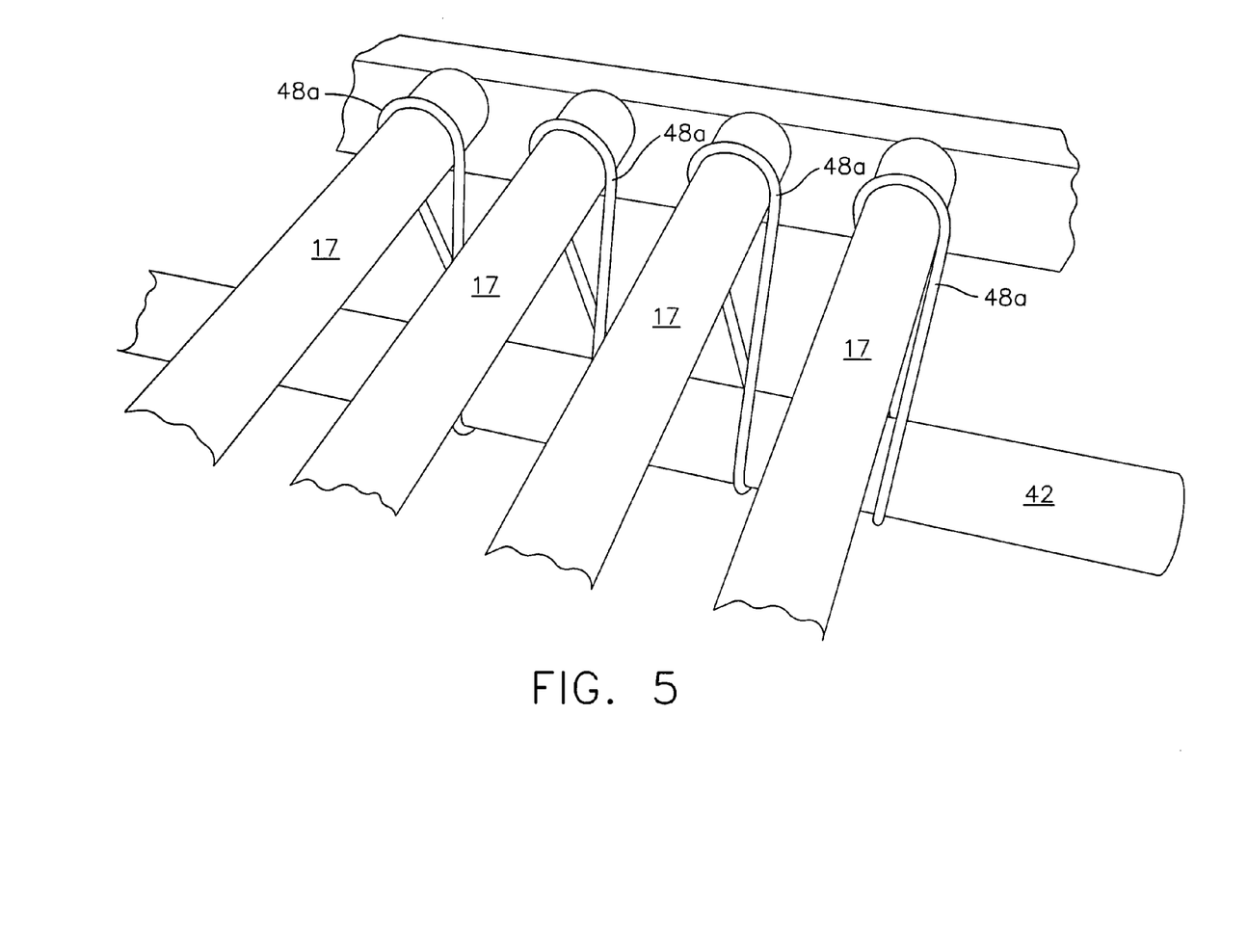
FIG. 5 is an enlarged, fragmentary, top perspective view of an alternate embodiment of the drive elements between the drive member and the conveyor rollers.

Referring to FIG. 5, there is shown an enlarged, fragmentary, top perspective view of an alternate embodiment of drive elements 48a between drive member 42 and conveyor rollers 17. In this embodiment, there are no annular grooves on conveyor rollers 17. This allows the present invention to be used to retrofit existing gravity conveyors, by simply adding drive member 42 and sensors PE1 and PE2, without having to replace the existing rollers. Although O-belts 48a do not track around conveyor rollers 17 along a single line as they would in an annular groove, the range of motion of O-belts 48 is constrained by the locations and orientation of the drive member 42 shafts and conveyor rollers 17.

In the embodiment depicted, conveyor rollers 16 could be coated for increased friction, although such is not always necessary, and reduces the cost if omitted. In the embodiment depicted, conveyor rollers 16 were model GR-(BF")-137L16C (where BF" is the dimension between frames in inches) available from SST, having an outside diameter of 1⅜ inches. Conveyor rollers 16 have grease packed shielded bearings.

In the gravity conveyors, e.g., 9 and 11, conveyor rollers 24 were model GR-(BF")-135B18C available from SST, having an outside diameter of 1⅜ inches. These rollers 24 have lightly oiled, open bearings, with a small axle which presents less bearing friction, making it easier for packages to overcome the bearing friction.

Figure 6:
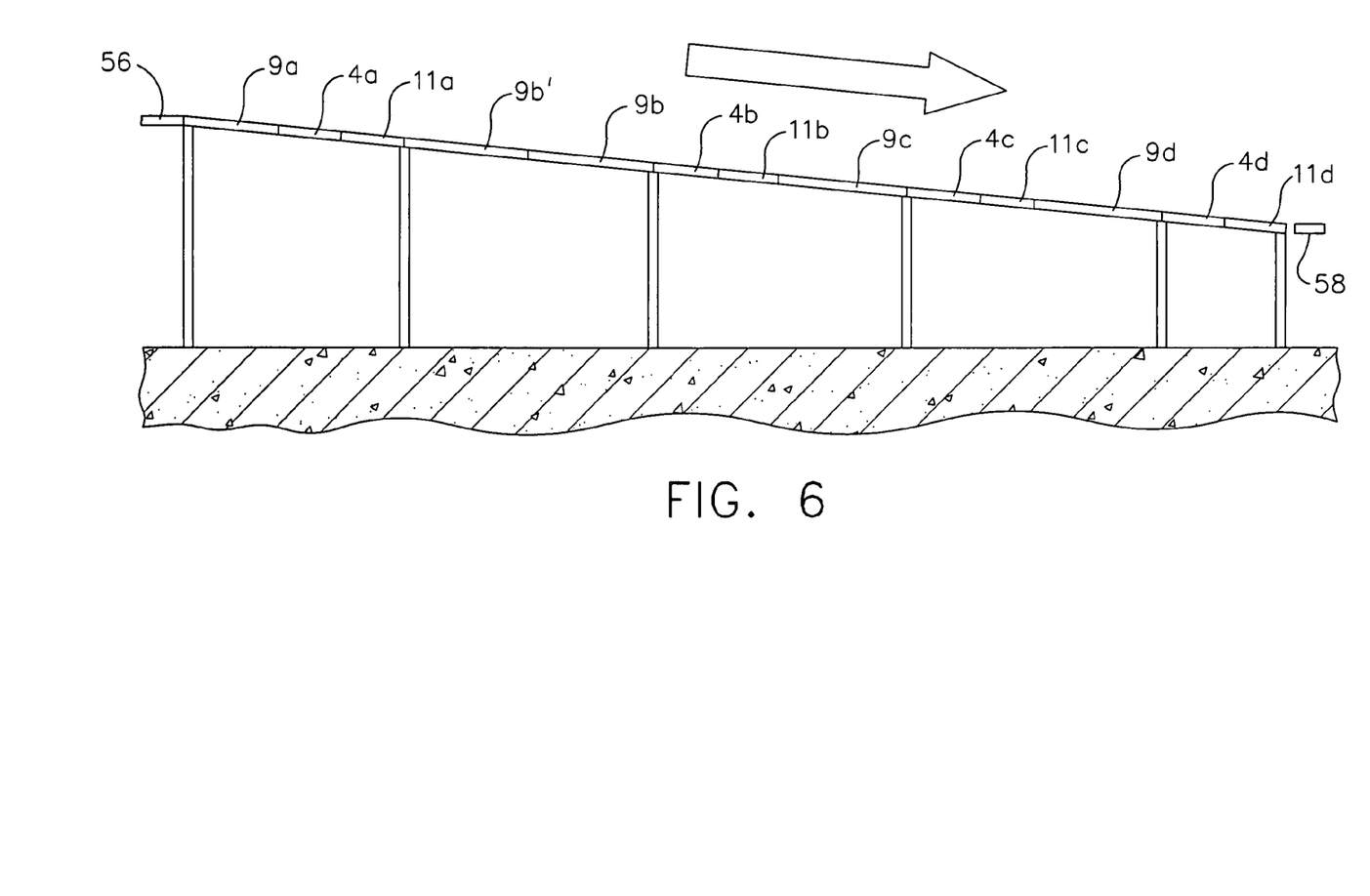
FIG. 6 is a diagrammatic side view of a conveyor comprising a plurality of controlled conveyor sections as illustrated in FIG. 1 with gravity conveyor sections interposed therebetween.

Referring now to FIG. 6, which is a diagrammatic side view of a declined conveyor comprising a plurality of controlled conveyor sections 4a–d, with gravity conveyor sections 9a–d and 11a–d interposed therebetween. The embodiment depicted is presented as an example, to which the practice of the invention and the claims are not limited. Packages arriving at the high end 56, such as from a sortation conveyor, may be traveling at any speed, even including high speeds, for example, 400 feet per minute or more. Packages first encounter gravity conveyor 9a, about 9 feet long for example, which may impede the package flow if the rollers are spinning slower than the package speed. The drive member of first controlled conveyor 4a may have, for example, a speed of about 30 meters per minute. Packages are slowed a little as they flow across controlled conveyor 4a, about 6 feet long for example, with the skew section driving the packages toward edge alignment. Packages flow from controlled conveyor 4a to gravity conveyor 11a, about 6 feet long for example, and from there to a section of gravity conveyor designated 9b□, about 12 feet long for example, which may, of course, be considered with gravity conveyor 9b as a single gravity conveyor. Packages may pick up speed in gravity conveyors 9b□ and 9b before entering second controlled conveyor 4b, which slows the packages and tends to realign them toward the edge. The drive member of second controlled conveyor 4b may have, for example, a speed of about 20 meters per minute. Packages flow from controlled conveyor 4b to gravity conveyor 11b, and from there to gravity conveyor 9c. From there, to controlled conveyor 4c, the drive member of which may have, for example, a speed of about 15 meters per minute. As with the earlier controlled conveyors, controlled conveyor 4c slows the packages and tends to realign them toward the edge. Similar to before, packages flow from controlled conveyor 4c to gravity conveyors 11c and 9d. Packages reach the last depicted controlled conveyor 4d, the drive member of which may have, for example, a speed of about 15 meters per minute. Controlled conveyor 4d slows the packages and tends to realign them toward the edge. From there the packages flow to gravity conveyor 11d, and to level conveyor 58. It is noted that generally the higher the speed of the drive member, the lower the available torque of the drive member and concomitantly the lower the available torque of conveyor rollers driven by that drive member. The lower the torque of the conveyor rollers, the easier it is for packages to overrun the conveyor rollers. For packages moving faster than the conveyor rollers when the packages enter the controlled conveyor, the ability for the conveyor rollers to be overrun is advantageous, reducing sudden speed changes and allowing the controlled conveyor to absorb surges of packages.

In the embodiment depicted, each controlled conveyor 4 of the declined conveyor is controlled independently of each other. In the depicted embodiment, the MDR used as drive member 42 includes the driver card required for the motor. Electronics on board the driver card function as the controller for its respective controlled conveyor 4, as it can be programmed with the logic for controlling the motor driver. It is noted that a separate controller may be used, or even a single common controller for all controlled conveyors 4.

There are ways to practice the present invention without a controller, such as, for example, if sensors having timers are used. In such a configuration, such sensors might be used in conjunction with an external hard wired circuit configuration that effects control.

Controlled conveyor 4 is controlled in a manner that maintains control of packages as they travel down the decline conveyor, and can minimize pressure if the declined conveyor becomes backed up.

Figure 7:
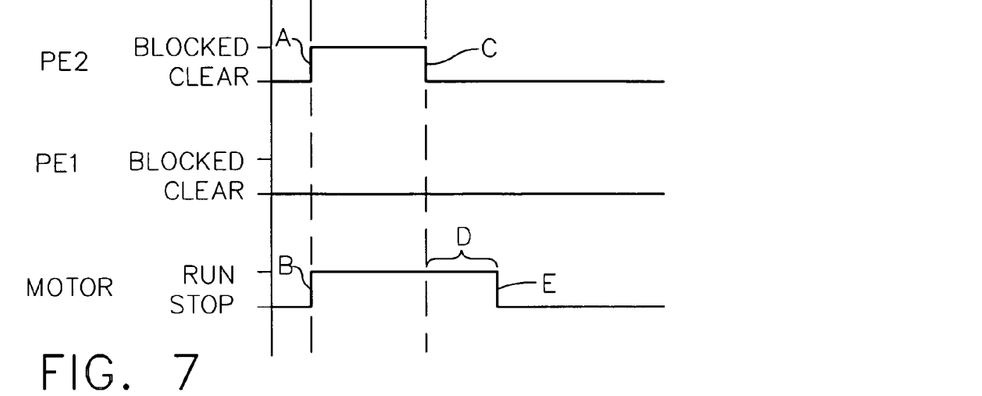
FIGS. 7–9 are control timing charts.

Until a package is detected by sensor PE2, drive member 42 is not running. Referring to FIG. 7, once the controller receives a signal from sensor PE2 indicating the presence of a package, indicated at A, and sensor PE1 is not indicating the presence of a package, the controller starts the motor for drive member 42, indicated at B. Since sensor PE2 is configured to detect an arriving package when it is upstream of controlled conveyor 4, the motor will be running when a package reaches controlled conveyor 4. When the package has cleared sensor PE2, indicated at C, the controller is notified that sensor PE2 has become unblocked, and the motor continues running for a period of time, referred to as run holding time, indicated at D, so as to pass the package out of controlled conveyor 4 to downstream gravity conveyor 11. When the run holding timer has timed out, the controller stops driving the motor, indicated at E. In the embodiment depicted, the run holding time is fixed at 7 seconds. A series of packages may be spaced such that sensor PE2 remains blocked through the last of the packages, at which time the run holding timer of the controller will start and the controller will continue to drive the motor until the timer times out.

Figure 8:
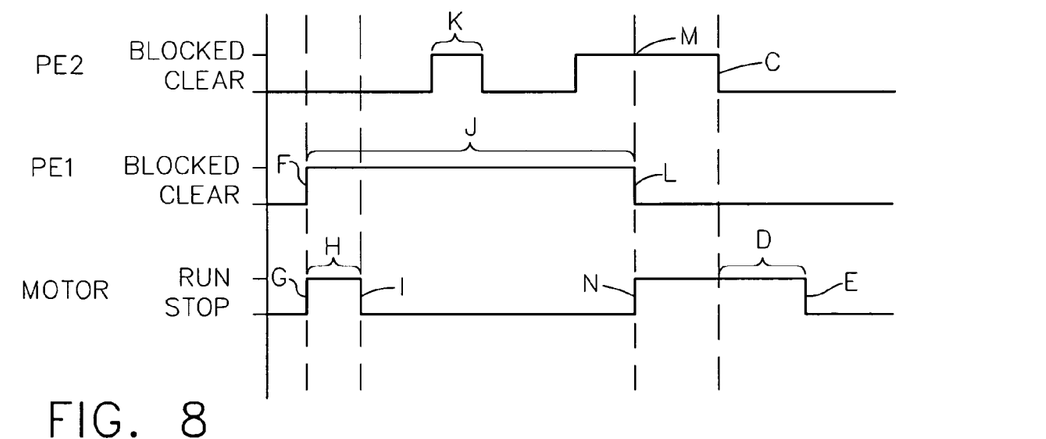

Referring to FIG. 8, if a package is sensed by sensor PE1, indicated at F, the controller will start the motor, indicated at G. If sensor PE1 remains blocked for more than a predetermined time, referred to as jam time, indicated at H, the controller will stop the motor, indicated at I, and maintain the motor stopped for the duration that sensor PE1 indicates a package, indicated at J, even if sensor PE2 indicates the presence of a package, indicated at K, during duration J. If, at the time sensor PE1 ceases indication presence of a package indicated at L, and sensor PE2 is indicating presence of a package, indicated at M, the controller will start the motor, indicated at N, and the control cycle described in reference to FIG. 7 is followed. If sensor PE2 was not blocked at the time sensor PE1 became unblocked, at L, the motor would start for a period of time, referred to as the second run holding time, to clear the controlled conveyor.

Figure 9:
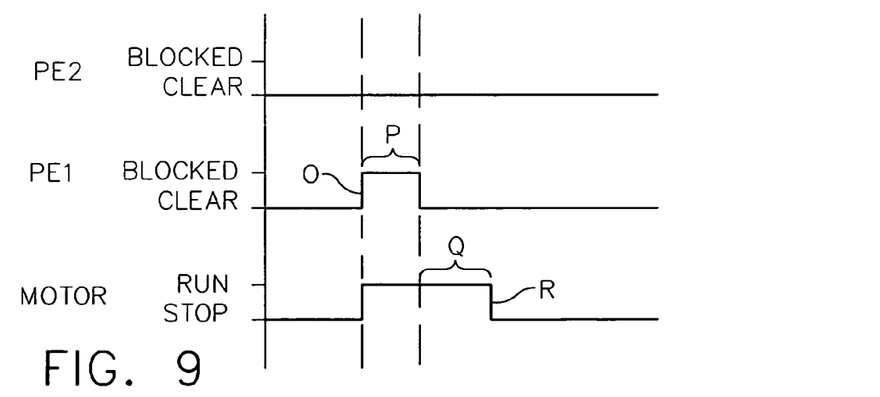

Referring to FIG. 9, if a package is sensed by sensor PE1, indicated at O, for a duration of time, indicated at P, which is less than the jam time, the controller will continue to run the motor for a period of time, referred to as the second run holding time, indicated at Q, which is how long the motor continues to run after sensor PE1 has been cleared. Once the second run holding timer times out, the controller stops the motor, indicated at R. It is noted that if sensor PE2 was blocked when the second run holding timer timed out, the control cycle described in reference to FIG. 7 is followed, and the motor would not stop at R. In the depicted embodiment, the second run holding time is variable and may be set at any period of time, 5 seconds for example, long enough to insure that packages are conveyed off of controlled conveyor 4 to gravity conveyor 11.

It is noted that the controlled conveyor section according to the present invention is not limited to the previously described control method, and may be used with any suitable control method, and control circuit and logic.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

What is claimed is:

1. A conveyor section having an entrance and an exit, said conveyor configured to convey articles along a conveying surface in a downstream direction, said conveyor comprising:
   a. a pair of spaced apart conveyor side frames extending in a longitudinal direction, said longitudinal direction being generally parallel to said downstream direction, said pair having a first end and a second end, said first end being disposed adjacent said entrance, said second end being disposed adjacent said exit, said first end being configured to be disposed higher than said second end;
   b. a first plurality of spaced apart consecutive conveyor rollers defining at least a first part of said conveying surface and a second plurality of spaced apart consecutive conveyor rollers disposed downstream of said first plurality and defining at least a second part of said conveying surface, said second plurality of said conveying rollers being gravity rollers, each of said conveyor rollers having an axis of rotation and two spaced apart ends, each of said spaced apart ends being supported by a respective one of said conveyor side frames, each of said conveyor rollers being disposed transverse to said downstream direction;
   c. a drive member carried by said conveyor, said drive member having a drive axis of rotation generally extending in said longitudinal direction;
   d. said drive member being operatively connected to conveyor rollers of said first plurality of spaced apart conveyor rollers by at least one drive element; and
   e. a motor operatively connected only to said drive member so as to rotate said drive member about said drive axis of rotation.

2. The conveyor of claim 1, comprising a control configured to run said motor.

3. The conveyor of claim 1, comprising a sensor disposed to sense presence of an article on said conveyor section.

4. The conveyor of claim 3, wherein said first sensor is configured to sense the presence of an article within an area above said conveying surface, said area having a width extending transverse to said longitudinal direction and a length extending in said longitudinal direction.

5. The conveyor of claim 1, comprising a sensor disposed to sense presence of an article at a predetermined location downstream of said first plurality of spaced apart rollers.

6. The conveyor of claim 1, comprising;
   a. a control configured to run said motor;
   b. a first sensor disposed to sense presence of an article arriving at said entrance;
   c. a second sensor disposed to sense presence of an article at a predetermined location on said second plurality of rollers downstream of said first plurality of rollers; and
   d. said first and second sensors being connected to said control.

7. The conveyor of claim 6, wherein at least two rollers of said first plurality of conveyor rollers are skewed with respect to said downstream direction.

8. The conveyor of claim 1, wherein said drive member is disposed below said conveying surface.

9. The conveyor of claim 1, wherein at least two rollers of said first plurality of conveyor rollers are skewed with respect to said downstream direction.

10. The conveyor of claim 1, wherein said drive member comprises a tube.

11. The conveyor of claim 10, wherein said motor is disposed within said tube.

12. The conveyor of claim 1, comprising a plurality of drive members carried by said conveyor, each said drive member having a drive axis of rotation generally extending in said longitudinal direction.

13. A conveyor system configured to convey articles in a downstream direction along a conveying surface, said conveyor comprising:
  a. a plurality of declined gravity conveyor sections; and
  b. a plurality of controlled conveyor sections, each said controlled conveyor section being disposed upstream of a respective one of said plurality of declined gravity conveyor sections, each of said controlled conveyor sections comprising:
    i. a pair of spaced apart conveyor side frames extending in a longitudinal direction, said longitudinal direction being generally parallel to said downstream direction, said pair having a first end and a second end;
    ii. a first plurality of spaced apart consecutive conveyor rollers defining at least a first part of said conveying surface, each of said conveyor rollers having an axis of rotation and two spaced apart ends, each of said spaced apart ends being supported by a respective one of said conveyor side frames, said conveyor roller being disposed transverse to said downstream direction;
    iii. at least one drive member carried by said controlled conveyor section, said drive member having a respective drive axis of rotation generally extending in said longitudinal direction;
    iv. each said drive member being operatively connected to a respective motor so as to rotate each of said drive members about its said respective drive axis of rotation; and
    v. rollers of said first plurality of spaced apart conveyor rollers being connected to at least one of said at least one drive member by at least one of a plurality of drive elements such that rotation of said rollers of said first plurality of spaced apart conveyor rollers is controlled by said at least one drive member.

14. The conveying system of claim 13, wherein each controlled conveyor sections comprises:
  a. a control configured to run said respective motor;
  b. a first sensor disposed to sense presence of an article arriving at said entrance;
  c. a second sensor disposed to sense presence of an article at a predetermined location on that gravity conveyor located downstream of said controlled conveyor section, said article having been discharged from said controlled conveyor section; and
  d. said first and second sensors being connected to said control.

15. The conveying system of claim 14, wherein at least two of said first plurality of conveyor rollers are skewed with respect to said downstream direction.

16. The conveyor of claim 13, wherein at least one of said at least one drive member comprises a tube.

17. The conveyor of claim 16, wherein said respective motor is disposed within said tube.

18. The conveyor of claim 13, wherein at least one of said at least one drive member is disposed below said conveying surface.

19. A conveyor section having an entrance and an exit, said conveyor configured to convey articles along a conveying surface in a downstream direction, said conveyor comprising:
  a. a pair of spaced apart conveyor side frames extending in a longitudinal direction, said longitudinal direction being generally parallel to said downstream direction, said pair having a first end and a second end, said first end being disposed adjacent said entrance, said second end being disposed adjacent said exit, said first end being configured to be disposed higher than said second end;
  b. a first plurality of spaced apart consecutive conveyor rollers defining at least a first part of said conveying surface and a second plurality of spaced apart consecutive conveyor rollers disposed upstream of said first plurality and defining at least a second part of said conveying surface, said second plurality of said conveying rollers being gravity rollers, each of said conveyor rollers having an axis of rotation and two spaced apart ends, each of said spaced apart ends being supported by a respective one of said conveyor side frames, each of said conveyor rollers being disposed transverse to said downstream direction;
  c. a drive member carried by said conveyor, said drive member having a drive axis of rotation generally extending in said longitudinal direction;
  d. said drive member being operatively connected to rollers of said first plurality of spaced apart conveyor rollers by at least one drive element; and
  e. a motor operatively connected only to said drive member so as to rotate said drive member about said drive axis of rotation.

20. The conveyor of claim 19, comprising a control configured to run said motor.

21. The conveyor of claim 19, comprising a sensor disposed to sense presence of an article on said conveyor.

22. The conveyor of claim 21, wherein said first sensor is configured to sense the presence of an article within an area above said conveying surface, said area having a width extending transverse to said longitudinal direction and a length extending in said longitudinal direction.

23. The conveyor of claim 19, comprising a sensor disposed to sense presence of an article at a predetermined location downstream of said first plurality of spaced apart rollers.

24. The conveyor of claim 19, comprising;
  a. a control configured to run said motor;
  b. a first sensor disposed to sense presence of an article on said conveyor section;
  c. a second sensor disposed to sense presence of an article at a predetermined location downstream of said first plurality of rollers; and
  d. said first and second sensors being connected to said control.

25. The conveyor of claim 24, wherein at least two rollers of said first plurality of conveyor rollers are skewed with respect to said downstream direction.

26. The conveyor of claim 19, wherein said drive member is disposed below said conveying surface.

27. The conveyor of claim 19, wherein at least two of said first plurality of conveyor rollers are skewed with respect to said downstream direction.

28. The conveyor of claim 19, wherein said drive member comprises a tube.

29. The conveyor of claim 19, wherein said motor is disposed within said tube.

30. A conveyor system configured to convey articles in a downstream direction along a conveying surface, said conveyor comprising:
   a. a plurality of declined gravity conveyor sections; and
   b. a plurality of controlled conveyor sections, each said controlled conveyor section being disposed upstream of a respective one of said plurality of declined gravity conveyor sections, each of said controlled conveyor sections comprising:
      i. a pair of spaced apart conveyor side frames extending in a longitudinal direction, said longitudinal direction being generally parallel to said downstream direction, said pair having a first end and a second end;
      ii. a first plurality of spaced apart consecutive conveyor rollers defining at least a first part of said conveying surface, each of said conveyor rollers having an axis of rotation and two spaced apart ends, each of said spaced apart ends being supported by a respective one of said conveyor side frames, said conveyor roller being disposed transverse to said downstream direction;
      iii. at least one motor driven roller carried by said controlled conveyor section, said motor driven roller having a respective drive axis of rotation generally extending in said longitudinal direction; and
      v. rollers of said first plurality of space apart conveyor rollers being connected to at least one of said at least one drive member by at least one of a plurality of drive elements such that rotation of said rollers of said first plurality of spaced apart conveyor rollers is controlled by said at least one motor driven roller.

31. The conveying system of claim 30, wherein each controlled conveyor sections comprises:
   a. a control configured to run each of said at least one motor driven roller;
   b. a first sensor disposed to sense presence of an article on said controlled conveyor section;
   c. a second sensor disposed to sense presence of an article at a predetermined location on that gravity conveyor located downstream of said controlled conveyor section, said article having been discharged from said controlled conveyor section; and
   d. said first and second sensors being connected to said control.

32. The conveying system of claim 31, wherein at least two of said first plurality of conveyor rollers are skewed with respect to said downstream direction.

33. The conveyor of claim 31, wherein at least one of said at least one motor driven roller is disposed below said conveying surface.

* * * * *